United States Patent [19]

Wachi et al.

[11] Patent Number: 5,003,523

[45] Date of Patent: Mar. 26, 1991

[54] APPARATUS FOR RECORDING AND REPRODUCING INFORMATION ON AN OPTICAL DISK WITH A FOCUS SERVO SYSTEM FOR AVOIDING INFLUENCE OF TRAVERSE SIGNAL DURING SEARCH

[75] Inventors: Shigeaki Wachi, Tokyo; Eiji Kumagai, Saitama, both of Japan

[73] Assignee: Sony Corporation, Tokyo, Japan

[21] Appl. No.: 171,256

[22] Filed: Mar. 21, 1988

[30] Foreign Application Priority Data

Mar. 25, 1987 [JP] Japan .................................. 62-069053
Aug. 20, 1987 [JP] Japan .................................. 62-206970
Jan. 29, 1988 [JP] Japan .................................. 63-16838

[51] Int. Cl.$^5$ .............................................. G11B 7/00
[52] U.S. Cl. ........................ 369/44.34; 369/44.350; 369/44.270
[58] Field of Search .................. 369/45, 46, 54; 250/201 DF

[56] References Cited

U.S. PATENT DOCUMENTS

| | | | |
|---|---|---|---|
| 4,633,453 | 12/1986 | Ogawa | 369/45 X |
| 4,651,314 | 3/1987 | Yoshikawa et al. | 369/54 X |
| 4,658,391 | 4/1987 | Nozu et al. | 350/201 DF |
| 4,722,079 | 1/1988 | Matsumoti | 369/45 X |
| 4,730,294 | 3/1988 | Fuenada | 369/46 |
| 4,736,354 | 4/1988 | Yoshio | 369/45 |
| 4,769,801 | 9/1988 | Funada et al. | 369/45 |

FOREIGN PATENT DOCUMENTS

| | | |
|---|---|---|
| 58-45666 | 3/1983 | Japan . |
| 58-177574 | 10/1983 | Japan . |
| 62-257630 | 11/1987 | Japan .................................. 369/45 |

*Primary Examiner*—Aristotelis M. Psitos
*Attorney, Agent, or Firm*—Ronald P. Kananen

[57] ABSTRACT

An optical disk recording and reproducing appartus is provided with a signal processing circuit in a focus servo circuit for suppressing a traverse signal which has a frequency determined by the pitch of pre-grooves and the transversely shifting speed of a laser beam spot and which modulates a focus error signal during a search mode operation. This signal processing circuit successfully avoids an influence of the traverse signal focus servo system and thus assures accurate focus on the control.

24 Claims, 8 Drawing Sheets

APPARATUS FOR RECORDING AND REPRODUCING INFORMATION ON AN OPTICAL DISK WITH A FOCUS SERVO SYSTEM FOR AVOIDING INFLUENCE OF TRAVERSE SIGNAL DURING SEARCH

BACKGROUND OF THE INVENTION

1. Field of the Invention

The present invention relates generally to an optical disk recording and reproducing apparatus for recording and reproducing information on an optical disk. More specifically, the invention relates to an optical disk recording and reproducing apparatus with a focus servo system.

2. Description of the Background Art

Figures 1, 2, 2A, 3:
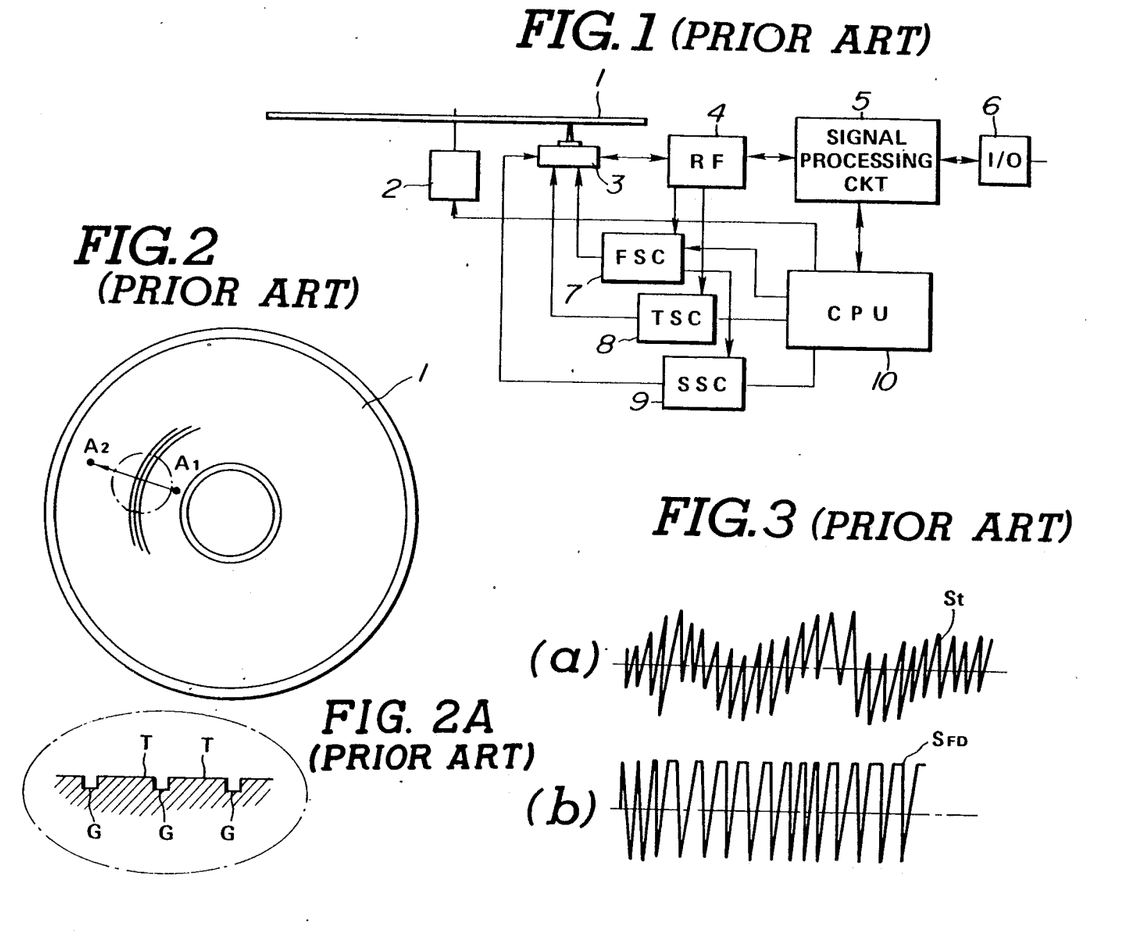

In order to facilitate a better understanding of the features of the present invention in relation to the background art, a brief discussion will be provided about the background art of the present invention with reference to FIGS. 1 and 2, which illustrate a circuit diagram of an optical disk recording and reproducing apparatus of the prior art.

The shown optical disk recording and reproducing apparatus of FIG. 1 is designed for recording and reproducing information on tracks formed on an optical disk 1. As is well known, the optical disk is chucked on a disk drive mechanism including a motor driven spindle 2 which is driven by a spindle motor for rotatingly driving the disk. As shown in FIGS. 2 and 2A, the optical disk to be used in the shown apparatus is a so-called "pre-grooved type disc" which has a plurality of recording tracks defined by preliminarily formed grooves. In addition, as a recordable optical disk, the shown embodiment employs an optomagnetic disk. The disk 1 chucked on the spindle 2 is thus driven at a given constant speed.

An optical head 3 is provided in the vicinity of the optical disk for optically reading or writing information on the recording tracks. The optical head 3 is connected to an RF circuit 4. The RF circuit 4, operating in a reproducing mode, converts the information read from the recording track by means of the optical head 3 into an electric signal indicative of the read information to output. On the other hand, the RF circuit 4, operating in a recording mode, converts the information containing an electric signal into optical information data in a form recordable on the recording track.

This RF circuit 4 is connected to a signal processing circuit 5. This signal processing circuit 5 performs a known signal processing operation. The signal processing circuit 5 is connected to an input/output circuit 6.

The RF circuit 4 also outputs a focus error signal to a focus servo circuit 7 to feed thereto a focus error signal. The RF circuit 4 is further connected to a tracking servo circuit 8 to feed a tracking error signal. The output of the focus servo circuit 7 is connected to the optical head 3. The output of the focus servo circuit 7 is also connected to a thread servo circuit 9 which controls transverse shift of the optical head 3.

Operation of the signal processing circuit 5, the focus servo circuit 7, a tracking servo circuit 8 and a thread servo circuit 9 are connected to a CPU 10 which serves as a system controller. The CPU 10 outputs a clock signal, a timing signal, an access signal and so forth. The CPU also outputs control signals for the aforementioned respective circuits for controlling operations thereof depending upon the operation modes thereof.

The CPU also serves to control the driving speed of the spindle motor for controlling rotation speed of the optical disk 1.

As shown in FIGS. 2 and 2(A), the grooves G are formed on the disk in concentric circular or helical fashion. The grooves will be hereafter referred to as "pre-grooves". Each pre-groove G has a width corresponding to where $\lambda/8$ ($\lambda$ is the wavelength of laser of the optical head). An adjacent pair of grooves G define a land which serves as a recording track T. As will be appreciated, the light intensity to be reflected from the pre-groove G and the land T is different from each other. Based on the difference of light intensity reflected from the groove and the land, a tracking error signal is generated so that a tracking servo system will control the optical head to place the light spot of the laser beam on a desired one of tracks for tracing therealong.

In such optical disk recording and reproducing apparatus, the reflected light intensity frequently varies every time the laser beam spot moves across the pre-groove during a search operation, in which the optical head is shifted transversely to the tracks. As a result, a high frequency signal St modulated by the pre-grooves, which is shown in FIG. 3(a) and will be hereafter referred to as "traverse signal", tends to be superimposed on the focus error signal.

The focus servo circuit 7 in FIG. 1 employs a phase compensation circuit 71 (FIG. 4) for enhancing a high frequency component of the focus error signal St for improving response characteristics. The output of the phase compensation circuit 71 is fed to a driver circuit 72. The driver circuit 72 generates a drive signal $S_{FD}$ for driving a focus actuator 73.

In this circuit arrangement, when the traverse signal superimposes on the focus error signal St, the traverse signal may be enhanced in the focus servo loop set forth above. As a result, the peak of the enhanced focus error signal tends to saturate to cause distortion of the waveform in the drive signal $S_{FD}$, as shown in FIG. 3(b). This distortion of the waveform of the drive signal $S_{FD}$ causes variation of the direct current level. Variation of the direct current level tends to degrade the accuracy of a focusing operation of the focus servo system.

SUMMARY OF THE INVENTION

Therefore, it is an object of the present invention to provide an optical disk recording and reproducing apparatus which can effectively and stably eliminate influence of a traverse signal for accurate focus control.

In order to accomplish the aforementioned and other objects, an optical disk recording and reproducing apparatus, according to the present invention, is provided with a signal processing circuit in a focus servo circuit for suppressing a traverse signal which has a frequency determined by the pitch of pre-grooves and the transversely shifting speed of a laser beam spot and modulates a focus error signal otherwise, during a search mode operation.

This signal processing circuit successfully avoid influence of the traverse signal for focus servo system and thus assures accurate focus control. According to one aspect of the invention, an optical disk recording and reproducing apparatus comprises an optical head scanning a light beam on an optical disk formed with a plurality of essentially circumferentially extending grooves for reproducing an information signal including a focus error signal, a focus servo system including a focus actuator operable for driving an object lens of the optical head for focusing a light beam on the optical disk, means associated with the focus actuator for deriving a focus control signal on the basis of the focus error signal in order to control the focus actuator, and means, active in an access mode operation of the optical disk recording and reproducing apparatus in which light beam shifts transversely across at least one of the grooves, for removing a signal component modulated by the groove, superimposing on the focus error signal.

According to another aspect of the invention, a focus control system for an optical disk recording and reproducing apparatus including an optical head scanning a light beam on an optical disk formed with a plurality of essentially circumferentially extending grooves for reproducing an information signal including a focus error signal and a focus servo system including a focus actuator operable for driving an object lens of the optical head for focusing a light beam on the optical disk, comprises a focus control signal generator means, associated with the focus actuator, for deriving a focus control signal on the basis of the focus error signal in order to control the focus actuator, and a traverse signal component absorbing means, provided upstream of the focus control signal generator, for absorbing fluctuation of the focus error signal within a predetermined fluctuation range in order for removing a traverse signal superimposing on the focus error signal.

The signal component removing means comprises a deadband circuit and a sample/hold circuit, the deadband circuit defining a deadband for the focus error signal for absorbing fluctuation of the focus error signal within the deadband so as to hold a held value in the sample/hold circuit unchanged.

The focus control system further comprises means for adjusting the deadband. The deadband adjusting means detects of the level of the signal component for adjusting the width of the deadband depending thereon. The deadband adjusting means detects the signal component superimposing on an output of the sample/hold circuit for adjusting the deadband.

In addition, the focus control system further comprises means for defining a signal path by-passing the deadband circuit for directly feeding an input focus error signal to the sample/hold circuit, the signal path including a switch operable between a conductive state for establishing the path and a non-conductive state for establishing the path and a non-conductive state for breaking the path and switching at the conductive state in response to a signal indicative of one of a tracking On state and focus search state.

According to a further aspect of the invention, a focus control system for an optical disk recording and reproducing apparatus including an optical head scanning a light beam on an optical disk formed with a plurality of essentially circumferentially extending grooves for reproducing information signal including a focus error signal and a focus servo system including a focus actuator operable for driving an object lens of the optical head for focusing a light beam on the optical disk, comprises a focus control signal generator means, associated with the focus actuator, for deriving a focus control signal on the basis of the focus error signal in order to control the focus actuator, and a focus error smoothing means, disposed upstream of the focus control signal generator, for smoothing the focus error signal for removing a traverse signal superimposing on the focus error signal.

The focus error signal smoothing means comprises a peak hold circuit for holding a peak value of the focus error signal, a bottom hold circuit for holding a bottom of the focus error signal and an adder adding outputs of the peak and bottom hold circuits. The peak and bottom hold circuits respectively include diodes and the apparatus further comprises means for compensating for non-linear characteristics of the diodes.

In this case, the focus control system also comprises means for defining a signal path by-passing the focus error signal smoothing means for directly feeding an input focus error signal to the sample/hold circuit, the signal path including a switch operable between a conductive state for establishing the path and a non-conductive state for establishing the path and a non-conductive state for breaking the path and switching at the conductive state in response to a signal indicative of one of a tracking On state and a focus search state.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 1, as preceedingly discussed, is a schematic block diagram of an optical disk recording and reproducing apparatus which constitutes background art of the present invention;

FIG. 2 is a plan view of a pre-groove type optical disk to be used in the optical disk recording and reproducing apparatus of the background art of FIG. 1 and of the preferred embodiment of the invention while FIG. 2A is an enlarged portion of FIG. 2;

FIGS. 3(a) and 3(b) show waveforms of a focus error signal and a drive signal in a focus servo system;

DESCRIPTION OF THE PREFERRED EMBODIMENT

Figure 4:
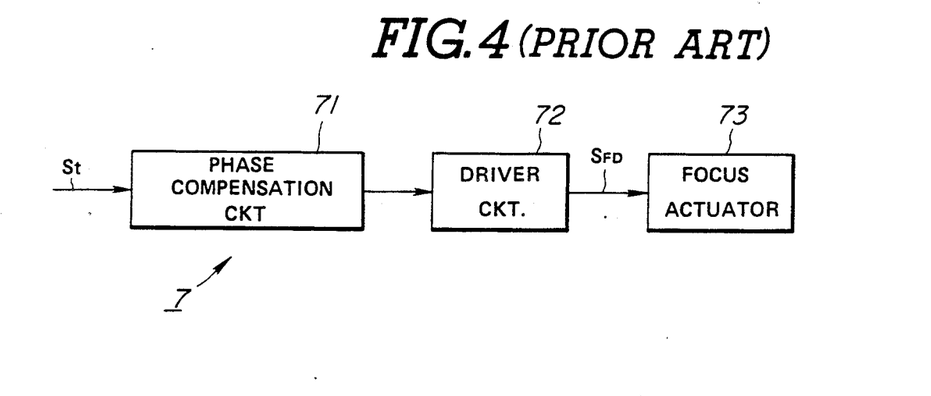
FIG. 4 is a block diagram of a focus servo circuit employed in the prior proposed optical disk recording and reproducing apparatus of FIG. 1.
Figure 5:
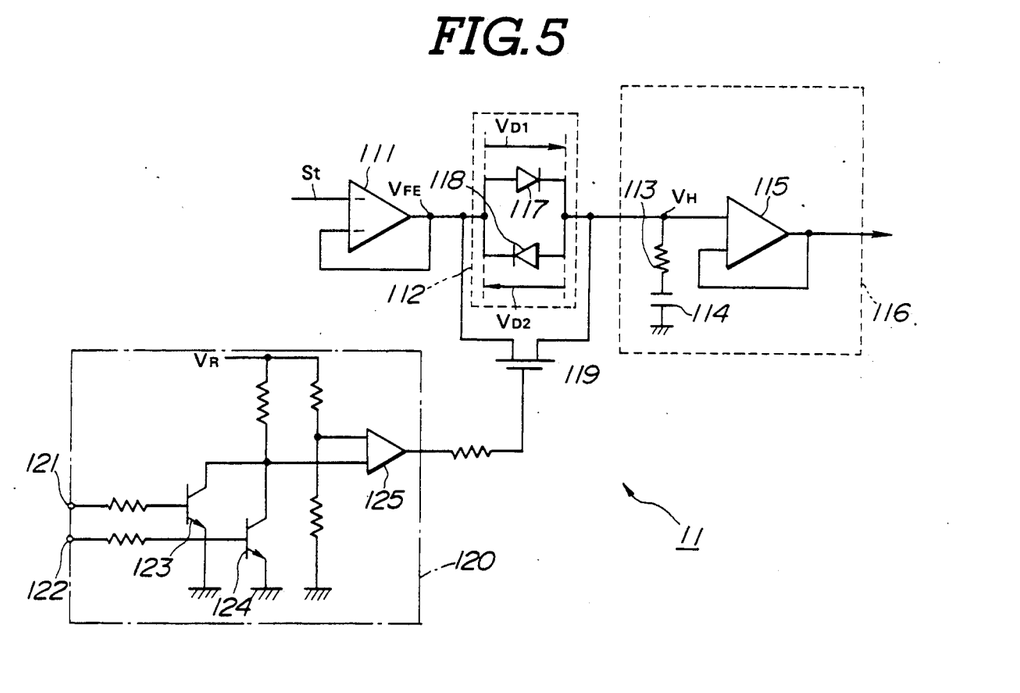
FIG. 5 is a circuit diagram of a traverse signal eliminating circuit and control circuit which forms the major part of the first embodiment of an optical disk recording and reproducing apparatus according to the invention.

Referring now to the preferred embodiments of the present invention, and particularly to FIG. 5, a traverse signal eliminating circuit 11 is interposed between an RF circuit 4 (shown in FIG. 1) and a phase compensation circuit 71 (shown in FIG. 4). The traverse signal eliminating circuit 11 includes an operational amplifier 111 which forms a voltage follower circuit. The operational amplifier 111 has a non-inverting input terminal connected to the RF circuit 4 to receive therefrom a focus error signal St. The operational amplifier 111 also has an inverting input terminal connected to the output of the operational amplifier to constitute a voltage follower circuit.

The output of the operational amplifier 111 is also connected to a deadband circuit 112. The deadband circuit 112 is connected to the phase compensation circuit 71 via a sample/hold circuit 116 which comprises a resistor 113, a capacitor 114 and an operational amplifier 115 which form a voltage follower circuit.

The deadband circuit 112 comprises a pair of diodes 117 and 118. The pair of diodes 117 and 118 are arranged in parallel relationship to each other and in opposite polarity. This deadband circuit 112 is designed to cancel the traverse signal superimposing on the focus error signal St with a potential difference of the rising voltage of the diodes.

Namely, a held voltage $V_H$ of the sample/hold circuit 116 is normally applied to the non-inverting input terminal of the operational amplifier 115. When the input voltage $V_{FE}$ to the deadband circuit 112 which contains the traverse superimposing signal, fluctuates in a fluctuation range ($V_H - V_{FE}$) smaller than the rising voltage $V_{D1}$ or $V_{D2}$ of the diodes 117 and 118, both of the diodes are held OFF. Therefore, the held voltage $V_H$ of the sample/hold circuit 116 is transferred to the phase compensation circuit 71.

On the other hand, when the voltage fluctuation range ($V_H - V_{FE}$) is greater than the rising voltage of the diodes 117 and 118, both diodes turn ON. By this the held voltage $V_H$ is varied in a magnitude corresponding to a difference of voltage determined by subtracting the riding voltage $V_{D1}$ or $V_{D2}$ of the diodes 117 or 118 from the fluctuated voltage ($V_H - V_{FE}$).

As will be appreciated, with the arrangement set forth above, when the input voltage $V_{FE}$ fluctuates in relation to the held voltage $V_H$, the held voltage will not be varied as long as the voltage fluctuation is in a range define by the rising voltages $V_{D1}$ and $V_{D2}$ of the diodes 117 and 118. This voltage fluctuation range will be hereafter referred to as "deadband". The traverse signal superimposing on the focus error signal St is successfully removed utilizing this deadband.

Figure 6:
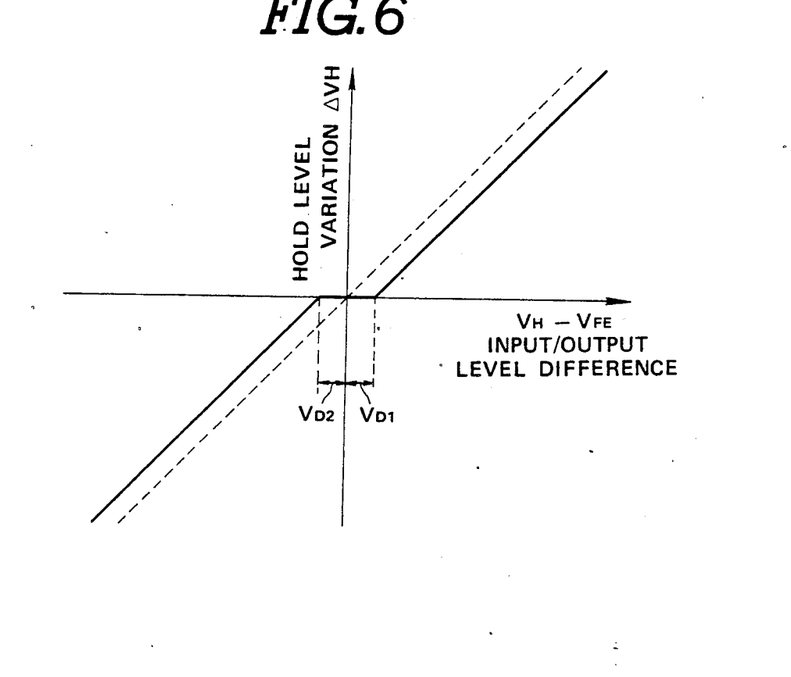
FIG. 6 is a graph showing input/output characteristics of an deadband circuit associated with the traverse signal eliminating-circuit of FIG. 5.

It should be noted that the input/output characteristics of the deadband circuit 112 are shown in FIG. 6. As will be seen from FIG. 6, the opposite connection of the diodes 117 and 118 will provide a substantially great absorption magnitude for small level signals, i.e. for the signals in a range of $V_{D1}$ and $V_{D2}$.

The foregoing deadband circuit 112 is associated with a control circuit 120 which controls the deadband circuit between an active state and an inactive state. In order to control the deadband circuit operational state between an active state and an inactive state, a switch 119 is provided. The control circuit 120 has input terminals 121 and 122 which are connected to a system controller (not shown). When a HIGH level input is applied to one of the input terminals 121 and 122, the switch 119 is operated to an open state to make the deadband circuit 112 inactive.

The input level at the input terminal 121 represents an operational state of the tracking servo system and is held HIGH while the recording and reproducing apparatus operates in a reproduction mode and thus the tracking servo system is an ON state. This turns the switch 119 ON to establish a by-pass circuit for by-passing the focus error signal $S_t$ through the switch 119. Similarly, the input level of the input terminal 122 represents a focus search operational state. When a focus search is ON, a HIGH level input is applied to the input terminal 122. By this, both of transistors 123 and 124 are turned ON to turn the switch 119 ON. This establishes the by-pass circuit for by-passing the focus error signal $S_t$ through the switch 119.

Figure 7:
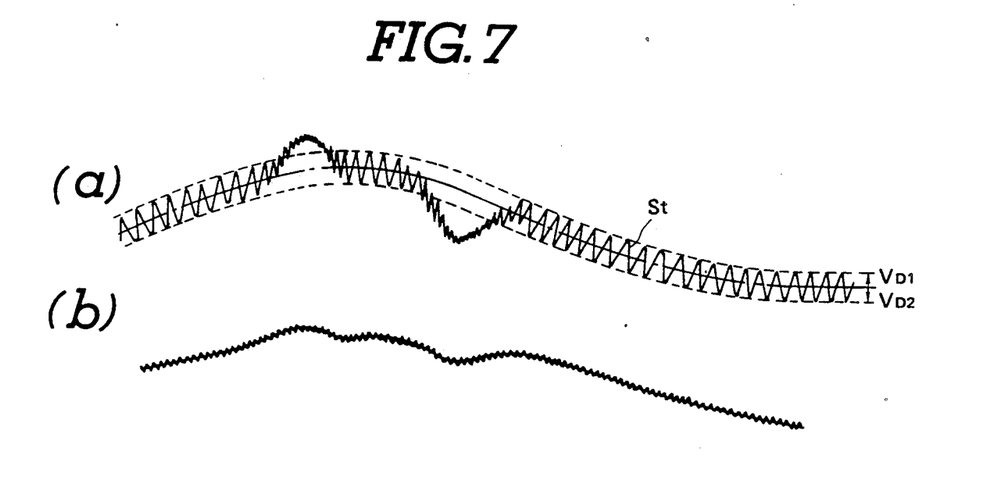
FIGS. 7(a) and 7(b) show waveforms of focus error signals St.

On the other hand, when the optical head is driven transversely to the tracks on the optical disk in a search mode operation, the tracking servo system turns into an OFF position to apply a LOW level to the input terminal 121. As a result, the transistor 123 is turned OFF to turn the switch 119 OFF. Therefore, the by-pass circuit through the switch 119 is broken to apply the focus error signal St to the deadband circuit 112. At this time, since the input/output characteristic of the deadband circuit 112 is as illustrated in FIG. 6, the focus error signal St (shown in FIG. 7(a)) as the input of the deadband circuit is absorbed as to the superimposing traverse signal component to output the signal having a waveform shown in FIG. 7(b). Since the output of the deadband circuit 112 shown in FIG. 7(b) has successfully removed the traverse signal component, the driver circuit 72 will never become saturated by the output of the phase compensation circuit 71.

On the other hand, at a ON setting of the recording and reproducing apparatus, or when the focus servo becomes an output of control, a focus search signal is applied to a driver circuit 72 for driving an object lens vertically for focus control. During a focus search, a HIGH level signal is applied to the input terminal 122 from the system controller. In response to the HIGH level input at the input terminal 122, the transistor 124 turns ON. This raises the output level of a differential amplifier 125 to turn the switch 119 ON. This establishes the aforementioned by-pass circuit through the switch 119 to pass the focus error signal St to the phase compensation circuit therethrough. Therefore, a focus search can be done accurately and precisely.

In the aforementioned first embodiment of the optical disk recording and reproducing apparatus, the deadband circuit is designed to be active only when the optical head is driven transversely to the tracks of the optical disk to shift the laser beam spot transversely across the pre-grooves, for absorbing or removing the traverse signal which can superimpose on the focus error signal. In other words, since the deadband circuit is held inactive while the tracking servo is ON. This avoids a possibility to activate the focus servo system in an off-focused condition due to an influence of the deadband circuit.

Figure 8:
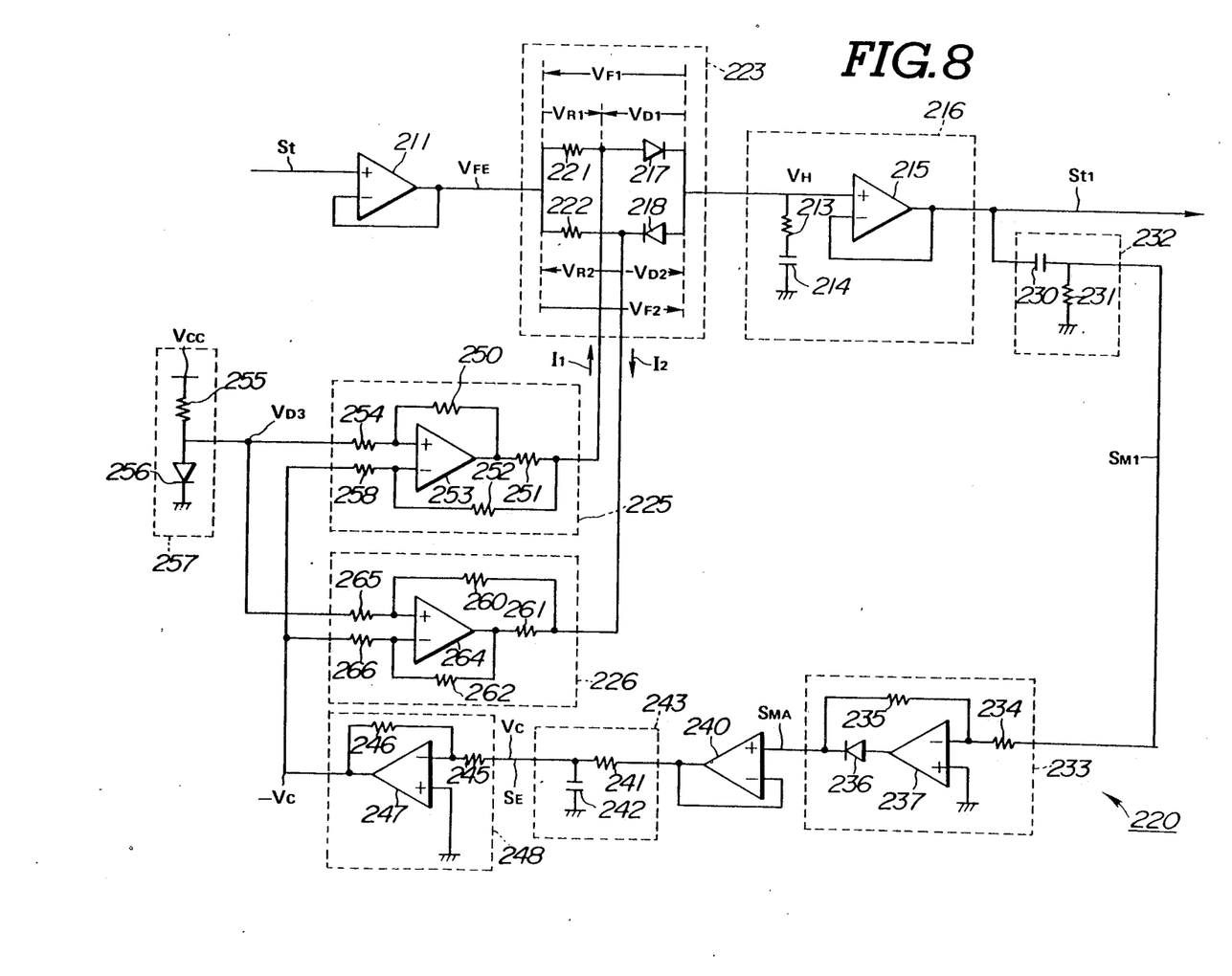
FIG. 8 is a circuit diagram of another embodiment of a traverse signal eliminating circuit to be employed in the optical disk recording and reproducing apparatus of the invention.

FIG. 8 shows another embodiment of the traverse signal eliminating circuit according to the invention. The shown embodiment of the traverse signal eliminating circuit is generally represented by the reference numeral 220. A deadband circuit 223 comprises a pair of diodes 217 and 218 and resistors 221 and 222 which are connected in series to associated ones of the diodes. Similarly to the former embodiment, the diodes 217 and 218 are arranged in parallel and in opposite polarity. The resistors 221 and 222 are provided with a resistance of $R_1$. A current source 225 is respectively connected to a junction between the series of the diode 217 and the resistor 221. Similarly, a current source 226 is connected to a junction between the series of diode 218 and the resistor 222. The current sources 225 and 226 are adapted to supply currents of $I_1$ and $I_2$ respectively. The currents $I_1$ and $I_2$ of the current sources 225 and 226 serve for causing a voltage drop $V_{R1}$ and $V_{R2}$ at the resistors 221 and 222 so as to apply an offset voltage $(V_{FE} - V_{R1}, V_{FE} + V_{R2})$ relative to the input voltage $V_{FE}$ to the diodes 217 and 218.

Therefore, the diodes 217 and 218 turn ON when the following formulae are established:

$$V_{D1} < (V_{FE} - V_{R1}) - V_H \tag{1}$$

$$V_{D2} < V_H - (V_{FE} + V_{R2}) \tag{2}$$

The foregoing formulae (1) and (2) are modified as:

$$V_{D1} + V_{R1} < V_{FE} - V_H \tag{3}$$

$$-(V_{D2} + V_{R2}) > V_{FE} - V_H \tag{4}$$

As will be seen from the foregoing formulae, the diodes 217 and 218 turn ON when the fluctuation magnitude of the input voltage $V_{FE}$ becomes out of the range defined by $(V_{D1} + V_{R1})$ and $-(V_{D2} + V_{R2})$. When the diodes 217 and 218 turn ON, the held voltage $V_H$ of a sample/hold circuit 216 varies. In other words, as long as the fluctuation magnitude of the input voltage $V_{FE}$ is maintained within the range defined by $(V_{D1} + V_{R1})$ and $-(V_{D2} + V_{R2})$, the held voltage $V_H$ can be held constant.

Here, as will be seen, since the deadband in a range defined by $(V_{D1} + V_{R1})$ and $-(V_{D2} + V_{R2})$ is variable depending upon the voltage drop $V_{R1}$ and $V_{R2}$, it can be adjusted by adjusting the currents $I_1$ and $I_2$ to be applied from the current sources 225 and 226.

In the shown embodiment, the current sources 225 and 226 are designed to vary the output currents $I_1$ and $I_2$ depending upon the level of the traverse signal. This adjusts the deadband range depending upon the traverse signal level for assured by remaining of the traverse signal, superimposing on the focus error signal and preventing the focus error signal level from being excessively lowered.

Figure 9:
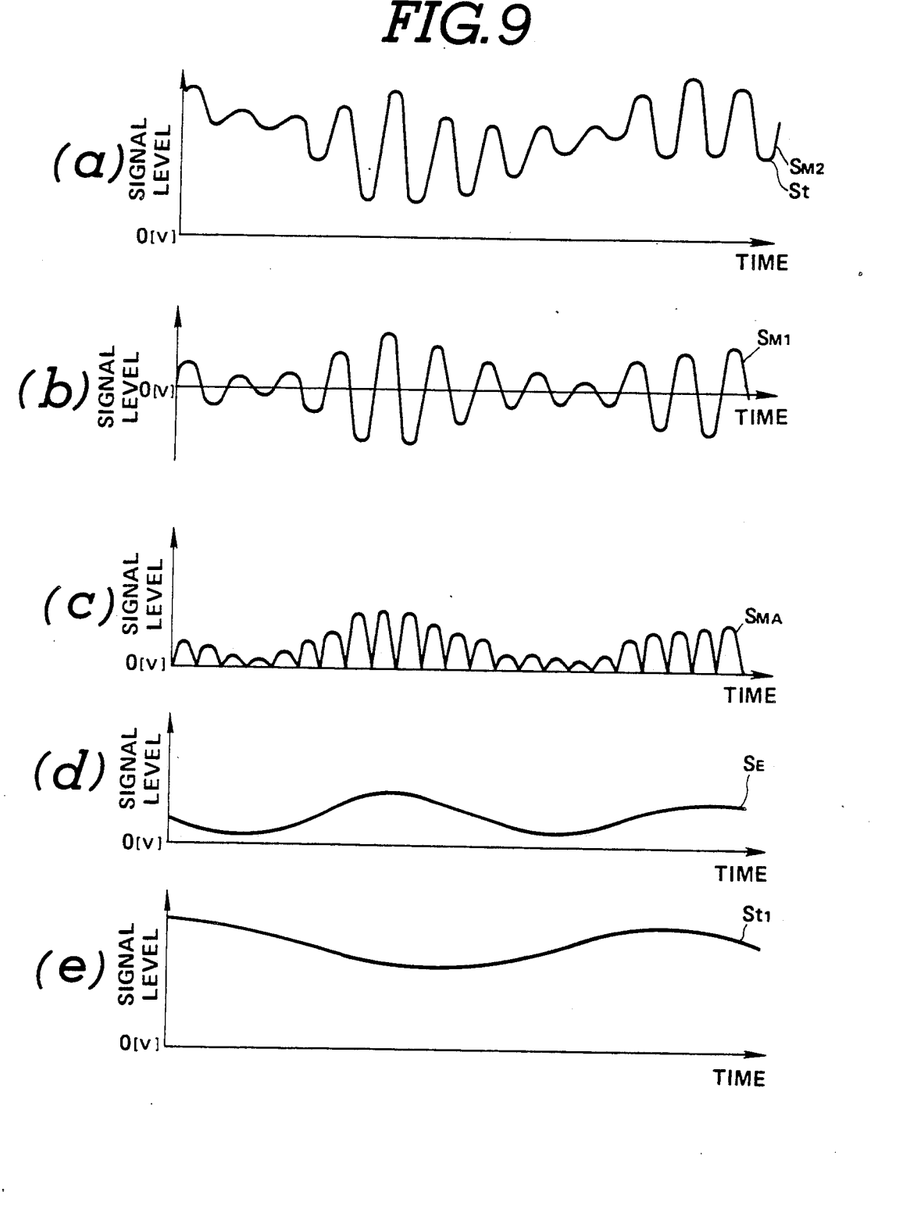
FIGS. 9(a), 9(b), 9(c), 9(d) and 9(e) are waveforms of signals produced in various components in the traverse signal eliminating circuit of FIG. 8.

For this purpose, a high-pass filter circuit 232 which comprises a capacitor 230 and a resistor 231 is connected to the output of the sample/hold circuit 216 in order to receive focus error signal $St_1$ output therefrom. The high-pass filter 232 extracts the traverse signal $S_{M1}$ from the focus error signal $St_1$. The traverse signal $S_{M1}$ extracted by the high-pass filter 232 is fed to a full-wave rectification amplifier 233. As a result, when the traverse signal $S_{M2}$ superimposed on the focus error signal, as shown in FIG. 9(a), is input to the traverse signal eliminating circuit 220, and when the traverse signal $S_{M2}$ causes the input signal fluctuation beyond the deadband defined in the deadband circuit 223, the excess magnitude of the traverse signal $S_{M1}$ is extracted by the high-pass filter circuit 232 and input to the full-wave rectification amplifier 233.

The full-wave rectification amplifier 233 comprises an input resistor 234, a feedback resistor 235 and an operational amplifier 237 including a rectification diode 236. The resistance of the input resistor 234 and the feedback resistor 235 are set at an equal value. With this circuit arrangement, the full-wave rectification amplifier 233 outputs a full-wave rectified output signal $S_{MA}$, as shown in FIG. 9(c). The output signal $S_{MA}$ of the full-wave rectification amplifier 233 is fed to an envelop detector circuit 243 which comprises a resistor 241, a capacitor 242 via an operational amplifier 240. As will be seen from FIG. 8, the envelop detector circuit 243 is in a form of a low-pass filter. Through this envelop detector circuit 243, an envelop signal $S_E$ (shown in FIG. 9(d)) can be obtained from the traverse signal $S_{M1}$ extracted by the high-pass filter 232.

The foregoing high-pass filter 232, the full-wave rectification amplifier 233, the operational amplifier 240, and the envelop detector circuit 243 form a traverse signal detector circuit.

The output of the envelop detector circuit 243 is connected to an inverting amplifier 248. The inverting amplifier 248 comprises an operational amplifier 247 having an input resistor 245 and a feedback resistor 246. The input resistor 245 and the feedback resistor 246 are provided with the same resistance value. With this arrangement, the inverting amplifier 248 receives the envelop signal $S_E$ as the output of the envelop detector circuit 243 and inverts the received envelop signal to provide an output to the current source circuits 225 and 226. Here, assuming the voltage level of the traverse signal $S_{M1}$ input to the inverting amplifier 248 is Vc, the voltage level of the envelop signal becomes $-Vc$.

The current source circuit 225 includes an operational amplifier 253 having an inverting input terminal, a non-inverting input terminal and an output terminal. A feedback resistor 250 is disposed between the non-inverting input terminal and the output terminal. On the other hand, a feedback resistor 252 is disposed between the inverting input terminal and the output terminal. The non-inverting input terminal of the operational amplifier 253 is also connected to a reference voltage source 257 comprising a resistor 255 and a temperature compensation diode 256, to receive therefrom a reference voltage $V_{D3}$. On the other hand, the inverting input terminal of the operational amplifier 253 is connected to the inverting amplifier 248 to receive the inverted envelop signal via a resistor 258. The output terminal of the operational amplifier 253 is connected to the resistor 221 of the deadband circuit 223 via an output resistor 251 to supply the current $I_1$. The resistance of the output resistor 251 is set at a value equal to the resistance $R_1$ of the resistor 221. On the other hand, the resistances of the feedback resistors 250 and 252 and the input resistors 254 and 258 are selected to be the equal in values to $R_2$ and to each other. With this circuit arrangement, the following equation can be established at the output resistor 251 with respect to input voltages Vc and $V_{D3}$ and the output current $I_1$:

$$I_1 R_1 = Vc - V_{D3} \tag{5}$$

On the other hand, the voltage drop $V_{R1}$ at the resistor 221 in relation to the current $I_1$ can be illustrated by:

$$V_{R1} = R_1 I_1 \qquad (6)$$

Therefore, the voltage drop $V_{R1}$ can be illustrated by:

$$V_{R1} = Vc - V_{D3} \qquad (7)$$

From the foregoing result, the voltage $V_{F1}$ defining the deadband and determined by the resistor 221 and the diode 217 can be illustrated by:
$$V_{F1} = V_{D1} + V_{R1} = V_{D1} + Vc - V_{D3} \qquad (8)$$

Assuming the diodes 217, 218 and 256 are provided with the same rising voltage, the following equation can be derived from the foregoing equation (8):

$$V_{F1} = Vc \qquad (9)$$

Therefore, the voltage $V_{F1}$ defining the deadband, which voltage is determined by the diode 217 and the resistor 221, can be controlled in proportion to the output voltage Vc.

On the other hand, the current source circuit 226 has an operational amplifier 264 having a non-inverting input terminal, an inverting input terminal and an output terminal. A feedback resistor 260 is connected to the output terminal via a resistor 261 at one end and to the non-inverting input terminal at the other end. On the other hand, a feedback resistor 262 is disposed between the output terminal and the inverting input terminal. The non-inverting input terminal of the operational amplifier 264 is also connected to the reference voltage source 257 via an input resistor 265. The inverting input terminal is, on the other hand, connected to the inverting amplifier 248 to receive therefrom the inverted envelop signal $-Vc$. In the shown circuit construction, the resistor 261 serves as an output resistor. This output resistor 261 has a resistance $R_1$ which is the same as that of the resistor 222. On the other hand, the resistances of the feedback resistors 260 and 262 and the input resistors 265 and 266 are set at the same value $R_2$.

With this circuit arrangement, the current source circuit 226 generates a current having the same amplitude as, and an opposite polarity to current $i_2$. As set forth, this current $I_2$ is applied to the resistor 222.

As will be appreciated, since the same or similar equations as discussed with respect to the current source circuit 225, apply the following relationship can be established:

$$\begin{aligned} V_{F2} &= Vc \\ &= V_{F1} \end{aligned} \qquad (10)$$

As will be appreciated herefrom, as controlled by the opposite polarity and the same amplitude of current $I_2$, the voltage $V_{F2}$ having the identical voltage value and having an opposite polarity, to define the deadband can be obtained, and can be controlled.

The current source circuits 225 and 226, the inverting amplifier 248 and the reference voltage source 257 constitute a deadband control circuit for controlling the width of the deadband according to the level of the envelop signal $S_E$. Furthermore, in the shown embodiment, the diodes 217 and 218 in the deadband circuit are provided with the same characteristics to that of the temperature compensation diode in the reference voltage source 257. Since a closed loop is formed as a whole of the traverse signal eliminating circuit for controlling the width of the deadband, temperature characteristics of the diodes 217 and 218 can be stably and effectively compensated for practical use.

As will be appreciated herefrom, the shown embodiment extracts the traverse signal maintained in the focus error signal St output from the sample/hold circuit, and controls the width of the deadband by adjusting the voltages $V_{F1}$ and $V_{F2}$. Therefore, a traverse signal can be effectively removed or absorbed from the focus error signal to obtain the waveform shown in FIG. 9(e).

Figure 10:
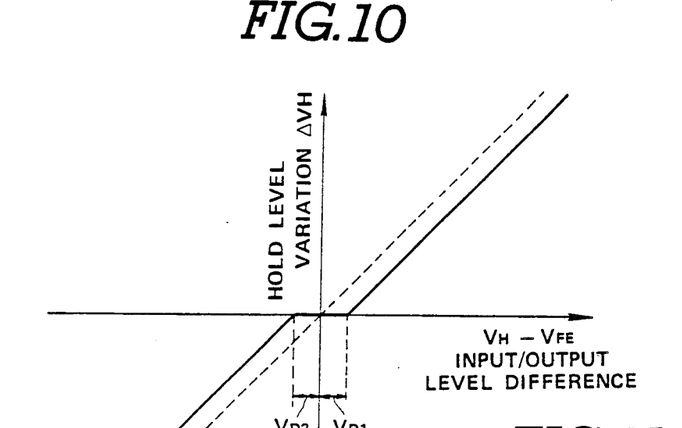
FIGS. 10 and 11 are graphs showing input/output characteristics of the deadband circuit associated with the traverse signal eliminating circuit of FIG. 8.
Figure 11:
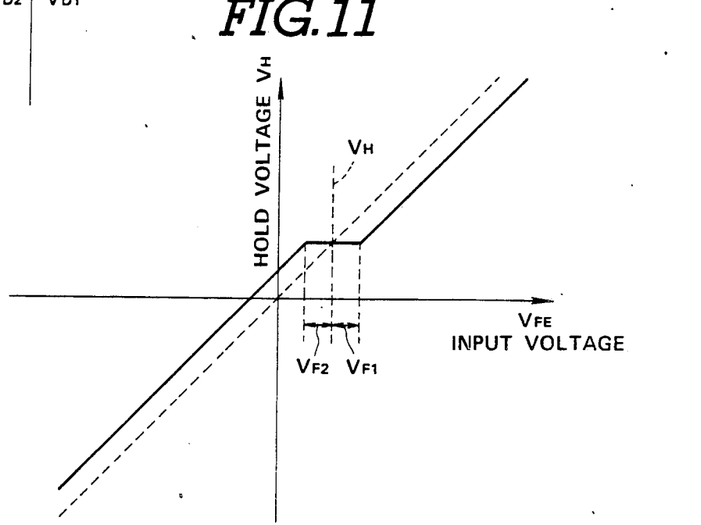
Figure 12:
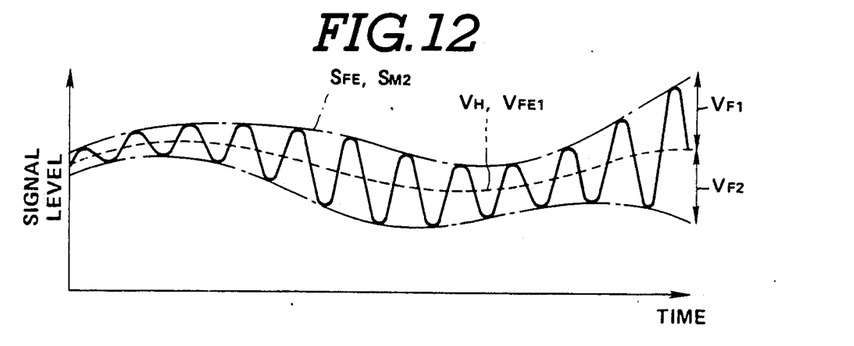
FIG. 12 is a chart showing waveforms of a focus error signal and output of a sample/hold circuit employed in the traverse signal eliminating circuit of FIG. 8.

Namely, as shown in FIG. 10, the deadband circuit 223 is provided with input/output characteristics variable of the width by variation of the voltages $V_{F1}$ and $V_{F2}$ with taking the input/output voltage difference $(V_H - V_{FE})$ of 0V as a center according to a traverse signal and since a closed loop is formed as a whole of the traverse signal eliminating circuit for controlling the width of the deadband, temperature characteristics of the diodes 217 and 218 can be compensated. As a result, the input/output characteristics of the deadband circuit, in which the voltages $V_{F1}$ and $V_{F2}$ defining the deadband varies with the held voltage $V_H$ of the sample/hold circuit 216, can be obtained.

Since the voltages $V_{F1}$ and $V_{F2}$ have opposite polarities and the same magnitude of voltage difference relative to the held voltage $V_H$, and the width of the deadband is variable depending upon the traverse signal level superimposing on the focus error signal so that the entire range of the traverse signal can be removed from the focus error signal, and influence of the traverse signal for the focus servo system can be successfully avoided.

In the practical construction, the gain of the focus control circuit is adjusted to be as great as possible in a range where oscillation of the focus servo circuit is avoided. The deadband circuit serves for preventing the focus servo from oscillating by adjusting the width of the deadband. This makes adjustment of gain of the focus control circuit easier and more simple.

It should be noted that though the shown embodiment employs resistors 221 and 222 having the same resistance as the resistors 251 and 261 of the current source means, it may possible to set the resistances of those resistors at mutually different values or to supply a different amplitude of current to the resistors 221 and 222 which may cause offset of the deadband with respect to the held voltage $V_H$.

Figure 13:
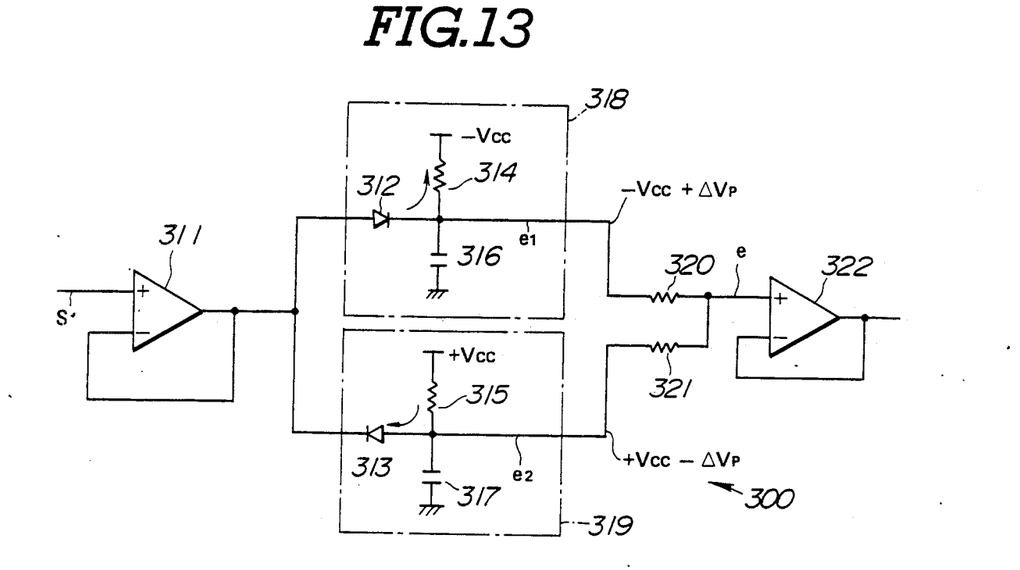
FIG. 13 is a further embodiment of a traverse signal eliminating circuit to be employed in the preferred embodiment of the optical disk recording and reproducing apparatus according to the invention.

FIG. 13 shows a further embodiment of the traverse signal eliminating circuit in the optical disk recording and reproducing apparatus. The shown embodiment of the traverse signal eliminating circuit is generally represented by the reference numeral 300. The traverse signal eliminating circuit 300 has an amplifier 311 which is of a voltage follower type construction and receives the focus error signal St. The traverse signal eliminating circuit 300 also include a pair of peak and bottom hold circuits 318 and 319. The peak hold circuit 318 comprises a diode 312, a resistor 314 and a capacitor 316. On the other hand, the bottom hold circuit 319 comprises a diode 313, a resistor 315 and a capacitor 317. The outputs of the peak and bottom hold circuits 318 and 319 are connected to an adder circuit 322 including resistors 320 and 321. The diodes 312 and 313 are connected to a respective constant voltage source $-Vcc$ and $+Vcc$ via the resistors 314 and 315. With the voltages $-V_{cc}$ and $+V_{cc}$ supplied via the resistors 314 and 315, suitable forward current flow occurs through the diodes 312 and 313. The resistance of the resistors 320 and 321 are set at the same values.

The focus error signal St is applied to the diodes 312 and 313 of the peak and bottom hold circuit 318 and 319 via the voltage follower type amplifier 311. The peak value of the focus error signal St is rectified by the diode 312 and changes the capacitor 316. On the other hand, the bottom value of the focus error signal St is rectified by the diode 313 and charges the capacitor 317.

Figure 14:
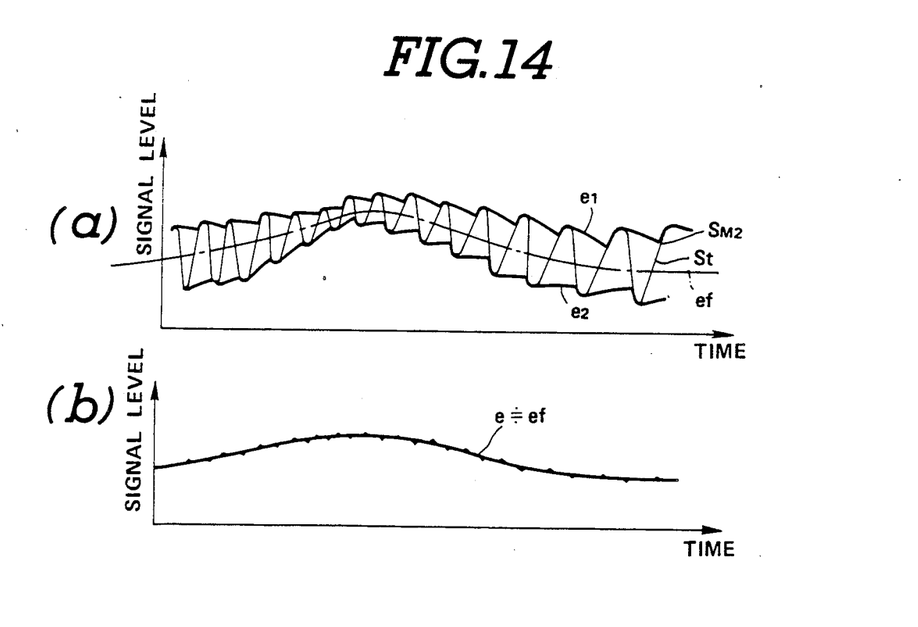
FIGS. 14(a) and 14(b) are waveforms in the circuit of FIG. 13.

Assuming the time constant of the resistor 314 and capacitor 316, and the resistor 315 and capacitor 317 is T, and when this time constant T is sufficiently greater than the period of the traverse signal $S_{M2}$, the terminal voltages of the capacitors 316 and 317 varies as shown as the peak hold voltage $e_1$ and bottom hold voltage $e_2$, as shown in FIG. 14(a). Since the peak hold voltage $e_1$ and the bottom hold voltage $e_2$ are applied through the resistors 320 and 321 of the same resistance, the voltage at the intersection point becomes $(e_1/2 + e_2/2)$ which becomes substantially equal to the pure focus error signal $e_f$, as shown in FIG. 14(b). The output of the adder 322 is output through an operational amplifier 323.

As will be appreciated herefrom; it is necessary to set the resistance of the resistors 314 and 315 and the capacitors 316 and 317 to provide a sufficiently great time constant in relation to the period of the traverse signal.

Figure 15:
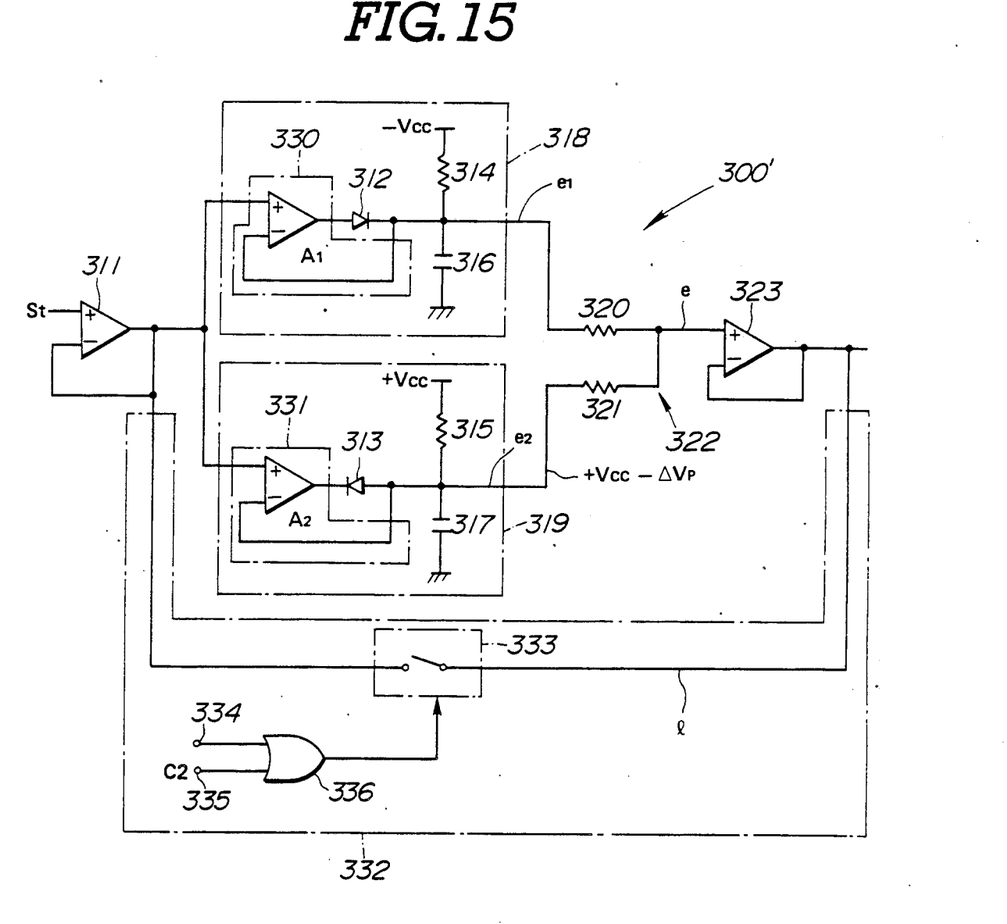
FIG. 15 is a modification of the traverse signal eliminating circuit of FIG. 13.

FIG. 15 shows a modification of the foregoing embodiment of the traverse signal eliminating circuit of FIG. 13. In this modification, operational amplifiers 330 and 331 are added in the peak and bottom hold circuits 318 and 319. These operational amplifiers 330 and 331 are provided for improving non-linear characteristics of the diodes 312 and 313. For this purpose, the operational amplifiers 330 and 331 are disposed between the amplifier 311 and the diodes 312 and 313 of the peak and bottom hold circuits 318 and 319.

Furthermore, the shown modification employs a bypass circuit by-passing the traverse signal eliminating circuit to directly feed the focus error signal to the phase compensation circuit. A switch 333 is disposed in the by-pass circuit for establishing and blocking the by-pass circuit. The position of the switch 333 is controlled by a gate signal of an OR gate 336. The OR gate is connected to one input terminal 334, to which a tracking ON state indicative signal is applied. The OR gate 336 is connected to the other input terminal 335, to which a focus search state indicative signal is applied. The OR gate 336 is responsive one of the tracking ON state indicative signal and the focus search state indicative signal to operate the switch 333 to the closed position for establishing the by-pass circuit.

As will be appreciated, a by-pass circuit with the switch 333 and the OR gate 336 to control the switch position between open and closed positions, will serve as a control circuit equivalent to that illustrated in FIG. 5, as the control circuit 125.

Therefore, in the embodiments of FIGS. 13 and 15, influence of the traverse signal can be successfully avoided by holding the peak and bottom values and obtaining average values thereof.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An optical disk apparatus comprising:
   an optical head scanning a light beam on an optical disk formed with a plurality of essentially circumferentially extending grooves for reproducing information signal including a focus error signal;
   a focus servo system including a focus actuator operable for driving an object lens of said optical head for focusing a light beam on said optical disk;
   means, associated with said focus actuator, for deriving a focus control signal on the basis of said focus error signal in order to control said focus actuator;
   means, active in an access mode operation of said optical disk apparatus in which a light beam shifts transversely across at least one of said grooves, for removing a signal component modulated by said groove and superimposed on said focus error signal; and
   means, associated with said signal component removing means, for switching an operational state of the signal component removing means, said switching means being responsive to a means for providing a tracking OFF indicative signal for activating said signal component removing means when said apparatus is not tracking.

2. An optical disk apparatus as set forth in claim 1, wherein said switching means operates said signal component removing means in an inactive state during focus search.

3. An optical disk apparatus as set forth in claim 1, wherein said signal component removing means comprises a peak hold circuit for holding a peak value of said focus error signal, a bottom hold circuit for holding a bottom of said focus error signal and an adder adding outputs of said peak and bottom hold circuits.

4. An optical disk apparatus as set forth in claim 3, wherein said peak and bottom hold circuits respectively include diodes and said apparatus further comprises means for compensating for non-linear characteristics of said diodes.

5. An optical disk apparatus as set forth in claim 3, which further comprises means for defining a signal path by-passing said peak and bottom hold circuits for directly feeding an input focus error signal to said sample/hold circuit, said signal path including a switch operable between a conductive state for establishing said path and a non-conductive state for breaking said path and switching at said conductive state in response to a signal indicative of one of tracking On state and focus search state.

6. An optical disk apparatus comprising:
   an optical head scanning a light beam on an optical disk formed with a plurality of essentially circumferentially extending grooves for reproducing information signal including a focus error signal;
   a focus servo system including a focus actuator operable for driving an object lens of said optical head for focusing a light beam on said optical disk;
   means, associated with said focus actuator, for deriving a focus control signal on the basis of said focus error signal in order to control said focus actuator;

means, active in an access mode operation of said optical disk apparatus in which a light beam shifts transversely across at least one of said grooves, for removing a signal component modulated by said groove and superimposed on said focus error signal; and means, associated with said signal component removing means, for switching an operational state of the signal component removing means, said switching means being responsive to a means for superimposed tracking OFF indicative signal for activating said signal component removing means when said apparatus is not tracking;

wherein said signal component removing means comprises a deadband circuit and a sample/hold circuit, said deadband circuit defining a deadband range of values for said focus error signal for absorbing fluctuation of said focus error signal within said deadband so as to hold a held value in said sample/hold circuit unchanged.

7. An optical disk apparatus as set forth in claim 6, which further comprises means for adjusting said deadband.

8. An optical disk apparatus as set forth in claim 7, wherein said deadband adjusting means detects the level of said signal component for adjusting the width of said deadband depending thereon.

9. An optical disk apparatus as set forth in claim 8, wherein said deadband adjusting means detects said signal component superimposing on an output of said sample/hold circuit for adjusting said deadband.

10. An optical disk apparatus as set forth in claim 6, which further comprises means for defining a signal path by-passing said deadband circuit for directly feeding an input focus error signal to said sample/hold circuit, said signal path including a switch operable between a conductive state for establishing said path and a non-conductive state for breaking said path and switching at said conductive state during a tracking ON state of the apparatus.

11. An optical disk apparatus as set forth in claim 6, which further comprises means for defining a signal path by-passing said deadband circuit for directly feeding an input focus error signal to said sample/hold circuit, said signal path including a switch operable between a conductive state for establishing said path and a non-conductive state for breaking said path and switching at said conductive state during a focus search state of the apparatus.

12. An optical disk apparatus as set forth in claim 6, which further comprises means for defining a signal path by-passing said deadband circuit for directly feeding an input focus error signal to said sample/hold circuit, said signal path including a switch operable between a conductive state for establishing said path and a non-conductive state for breaking said path and switching at said conductive state in response to a signal indicative of one of a tracking On state and a focus search state.

13. An optical disk apparatus as set forth in claim 12, which further comprises means for adjusting said deadband.

14. An optical disk apparatus as set forth in claim 13, wherein said deadband adjusting means detects the level of said signal component for adjusting the width of said deadband depending thereon.

15. An optical disk apparatus as set forth in claim 14, wherein said deadband adjusting means detects said signal component superimposing on an output of said sample/hold circuit for adjusting said deadband.

16. A focus control system for an optical disk apparatus including an optical head scanning a light beam on an optical disk formed with a plurality of essentially circumferentially extending grooves for reproducing information signal including a focus error signal and a focus servo system including a focus actuator operable for driving an object lens of said optical head for focusing a light beam on said optical disk, comprising:

a focus control signal generator means, associated with said focus actuator, for deriving a focus control signal on the basis of said focus error signal in order to control said focus actuator;

a traverse signal component absorbing means, cooperating with said focus control signal generator, for absorbing fluctuation of said focus error signal within a predetermined fluctuation range and removing a traverse signal superimposing on said focus error signal, said signal component absorbing means including a deadband circuit and a sample/hold circuit, said deadband circuit defining a deadband range of values for said focus error signal for absorbing fluctuations of said focus error signal within said deadband so as to hold a held value in said sample/hold circuit unchanged.

17. A focus control system as set forth in claim 16, which further comprises means for adjusting said deadband.

18. A focus control system as set forth in claim 17, wherein said deadband adjusting means detects the level of said signal component for adjusting the width of said deadband depending thereon.

19. A focus control system as set forth in claim 18, wherein said deadband adjusting means detects said signal component superimposing on an output of said sample/hold circuit for adjusting said deadband.

20. A focus control system as set forth in claim 16, which further comprises means for defining a signal path by-passing said deadband circuit for directly feeding an input focus error signal to said sample/hold circuit, said signal path including a switch operable between a conductive state for establishing said path and a non-conductive state for breaking said path and switching at said conductive state in response to a signal indicative of one of a tracking On state and a focus search state.

21. A focus control system for an optical disk apparatus including an optical head scanning a light beam on an optical disk formed with a plurality of essentially circumferentially extending grooves for reproducing an information signal including a focus error signal and a focus servo system including a focus actuator operable for driving an object lens of said optical head for focusing a light beam on said optical disk, comprising:

a focus control signal generator means, associated with said focus actuator, for deriving a focus control signal on the basis of said focus error signal in order to control said focus actuator;

a focus error smoothing means, cooperating with said focus control signal generator, for smoothing said focus error signal for removing a traverse signal superimposed on said focus error signal, wherein said focus error signal smoothing means comprises a peak hold circuit for holding a peak value of said focus error signal, a bottom hold circuit for holding a bottom value of said focus error signal and an adder adding outputs of said peak and bottom hold circuits.

22. A focus control system as set forth in claim 21, wherein said peak bottom hold circuits respectively include diodes and said apparatus further comprises means for compensating non-linear characteristics of said diodes.

23. A focus control system as set forth in claim 22, which further comprises means for defining a signal path by-passing said focus error signal smoothing means for directly feeding an input focus error signal to said sample/hold circuit, said signal path including a switch operable between a conductive state for establishing said path and a non-conductive state for breaking said path and switching at said conductive state in response to a signal indicative of one of tracking On state and focus search state.

24. A focus control system for an optical disk apparatus including an optical head scanning a light beam on an optical disk formed with a plurality of essentially circumferentially extending grooves for reproducing an information signal including a focus error signal and a focus servo system including a focus actuator operable for driving an object lens of said optical head for focusing a light beam on said optical disk, comprising:

a focus control signal generator means, associated with said focus actuator, for deriving a focus control signal on the basis of said focus error signal in order to control said focus actuator;

a focus error smoothing means, cooperating with said focus control signal generator, for smoothing said focus error signal for removing a traverse signal superimposed on said focus error signal; and means for defining a signal path by-passing said focus error signal smoothing means for directly feeding an input focus error signal to a sample/hold circuit, said signal path including a switch operable between a conductive state for establishing said path and a non-conductive state for breaking said path and switching at said conductive state in response to a means for providing a signal indicative of one of a tracking ON state and focus search state.

* * * * *